(12) United States Patent
Boyce et al.

(10) Patent No.: US 8,194,739 B2
(45) Date of Patent: Jun. 5, 2012

(54) TRICK PLAY USING TEMPORAL LAYERING

(75) Inventors: Jill MacDonald Boyce, Manalapan, NJ (US); Frederic Landais, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1135 days.

(21) Appl. No.: 11/990,407

(22) PCT Filed: Aug. 26, 2005

(86) PCT No.: PCT/US2005/030497
§ 371 (c)(1),
(2), (4) Date: Feb. 13, 2008

(87) PCT Pub. No.: WO2007/024232
PCT Pub. Date: Mar. 1, 2007

(65) Prior Publication Data
US 2009/0252228 A1    Oct. 8, 2009

(51) Int. Cl.
*H04B 1/66* (2006.01)
(52) U.S. Cl. .......... 375/240.13; 375/E7.03; 375/E7.011
(58) Field of Classification Search ............. 375/240.11, 375/240.12, 240.13
See application file for complete search history.

(56) References Cited

U.S. PATENT DOCUMENTS

| | | | |
|---|---|---|---|
| 6,057,832 A | 5/2000 | Lev et al. | |
| 6,330,365 B1 * | 12/2001 | Yasuda et al. | 382/233 |
| 6,373,905 B1 * | 4/2002 | Yasuda et al. | 375/340 |
| 6,377,748 B1 * | 4/2002 | Schultz et al. | 386/241 |
| 6,442,203 B1 | 8/2002 | Demos | |
| 6,621,979 B1 * | 9/2003 | Eerenberg et al. | 386/346 |
| 7,848,428 B2 * | 12/2010 | Chin | 375/240.16 |
| 2002/0065969 A1 * | 5/2002 | Schultz | 710/260 |
| 2002/0168175 A1 | 11/2002 | Green et al. | |
| 2005/0117640 A1 | 6/2005 | Han | |
| 2005/0117647 A1 | 6/2005 | Han | |
| 2006/0013305 A1 * | 1/2006 | Sun | 375/240.12 |
| 2006/0146934 A1 * | 7/2006 | Caglar et al. | 375/240.12 |

FOREIGN PATENT DOCUMENTS

| | | |
|---|---|---|
| JP | 2004-282703 | 10/2004 |
| JP | 2005-168017 | 6/2005 |
| JP | 2005-168021 | 6/2005 |

OTHER PUBLICATIONS

Puri, A. et al.: "Video coding using the H.264/MPEG-4 AVC compression standard," vol. 19, No. 9, Oct. 2004, pp. 793-849, XP004607150. Lee, J-Y et al.: "Motion Prediction Based on Temporal Layering for Lyered Video Coding," Published in the Proceeding of ITC-CSCC '98, vol. 1, Jul. 1998, pp. 1-4.
The International Search Report, dated Feb. 28, 2006.

* cited by examiner

*Primary Examiner* — Hassan Kizou
*Assistant Examiner* — Emmanuel Maglo
(74) *Attorney, Agent, or Firm* — Robert D. Shedd; Robert B. Levy; Jorge Tony Villabon

(57) ABSTRACT

The present invention provides a method and apparatus for encoding video content into a novel temporal layered coding structure. In one embodiment of the present invention, a plurality of sub-sequence layers are defined in a layer hierarchy in accordance with the present invention. A plurality of images within a sub-sequence of a group of images are selectively assigned to a respective one of the sub-sequence layers. A grouping of images contained in any sequential combination of sub-sequence layers that includes a hierarchically lowest of the sub-sequence layers results in a group of images that temporally are substantially evenly spaced. A related method and apparatus for decoding the temporally layered video content are also disclosed.

16 Claims, 5 Drawing Sheets

TRICK PLAY USING TEMPORAL LAYERING

This application claims the benefit, under 35 U.S.C. §365 of International Application PCT/US2005/030497, filed Aug. 26, 2005 published in accordance with PCT Article 21(2) on Mar. 1, 2007, in English.

FIELD OF THE INVENTION

The present invention generally relates to digital video signals and, more particularly, to encoding and decoding of video content.

BACKGROUND OF THE INVENTION

Video content is often digitally encoded in a compressed format to minimize an amount of storage necessary to store the video content, and to minimize the amount of bandwidth necessary for transmitting the video content to content viewers. Popular video compression standards are the established MPEG-2 format and the newer JVT/H.264/MPEG AVC (hereinafter "H.264") format.

In contrast to MPEG-2 which compresses video by encoding entire pictures, H.264 compresses video by compressing macroblocks of image pixels, or slices. In particular, H.264 uses tree-structured hierarchical macroblock partitions. For instance, 16×16 pixel macroblocks may be broken into macroblock partitions of sizes 16×8, 8×16 or 8×8. Macroblock partitions of 8×8 pixels are also known as sub-macroblocks. Sub-macroblacks may be further broken into sub-macroblock partitions of sizes 8×4, 4×8 or 4×4. An H.264 encoder may select how to divide the macroblock into partitions and sub-macroblock partitions in order to maximize compression efficiency and subjective quality. The division algorithm that is used is based on the characteristics of a particular macroblock.

Another distinguishing feature of H.264 is that it provides for supplemental enhancement information (SEI) and video usability information (VUI), which are extra information that can be inserted into the video bitstream to enhance the use of the video for a wide variety of purposes. Examples of SEI include a sub-sequence information SEI message, a sub-sequence layer characteristics SEI message, and a sub-sequence characteristics SEI message.

The sub-sequence information SEI message is used to indicate the position of a picture in a data dependency hierarchy that consists of sub-sequence layers and sub-sequences. A sub-sequence layer contains a subset of the coded pictures in a sub-sequence and is numbered with a non-negative integer. A layer having a larger layer number is a higher layer in the hierarchy than a layer having a smaller layer number. A sub-sequence is a set of coded pictures within a sub-sequence layer. A picture resides in only one sub-sequence, and a sub-sequence can be decoded independently of any picture that does not belong to the sub-sequence.

Although the standard H.264 layering hierarchy enables greater video compression in comparison to other video compression standards, such as MPEG-2, the prediction scheme is complex. For example, a predicted image (P-image) may actually be predicted from a bidirectional image (B-image). Thus, all images may need to be decoded, even when fast forward or fast reverse trick mode is being performed on the H.264 encoded video bitstream. Video processors powerful enough to provide high speed decoding adequate for such decoding are expensive. Thus, a solution is needed which enables fast forward and fast reverse playback to be performed using a low cost video processor.

SUMMARY OF THE INVENTION

An embodiment in accordance with the present invention includes a method and apparatus for encoding video content into a temporal layered coding structure. A plurality of sub-sequence layers can be defined in a layer hierarchy. A plurality of images within a sub-sequence of a group of images can be selectively assigned to a respective one of the sub-sequence layers. A grouping of images contained in any sequential combination of sub-sequence layers that includes a hierarchically lowest of the sub-sequence layers can result in a group of images that temporally are substantially evenly spaced.

Non-intra images can be predicted exclusively from one or more of the plurality of images which are assigned to a sub-sequence layer that is equal or lower in the layer hierarchy than the sub-sequence layer containing the non-intra image. Intra images (I-images) can be assigned exclusively to the hierarchically lowest sub-sequence layer and temporally can be substantially evenly spaced. Predictive images (P-images) can be assigned to a second of the sub-sequence layers which is one level higher than the lowest sub-sequence layer in the layer hierarchy. The I-images and the P-images can form a group of images that temporally are substantially evenly spaced.

A first set of bidirectional images ($B_R$-images) can be selected such that the $B_R$-images are predicted exclusively from images selected from the group consisting of I-images and P-images. The $B_R$-images can be assigned to a third of the sub-sequence layers, the third sub-sequence layer being one level higher than the second sub-sequence layer in the layer hierarchy. The I-images, the P-images and the $B_R$-images also can form a group of images that temporally are substantially evenly spaced.

A second set of bidirectional images ($B_U$-images) can be selected. The $B_U$-images can be predicted exclusively from images selected from the group consisting of I-images, P-images and $B_R$-images. The $B_U$-images can be assigned to a fourth of the sub-sequence layers. The fourth sub-sequence layer can be one level higher than the third sub-sequence layer in the layer hierarchy. The $B_U$-images temporally can be substantially evenly spaced in the fourth sub-sequence layer. Sub-sequence layer hierarchy structural information can be provided in sub-sequence information (SEI) messages, sub-sequence layer characteristic SEI massages, and/or video usability information (VUI) messages. The layer hierarchy structural information can indicate the temporal layered coding structure.

The present invention also includes a method and apparatus for decoding temporally layered video content. Selected ones of the sub-sequence layers can be decoded in accordance with the sub-sequence layer hierarchy structural information. The selected sub-sequence layers can be a sequential combination of sub-sequence layers that includes a hierarchically lowest of the sub-sequence layers. The sub-sequence layer hierarchy structural information can disallow prediction of an image from any of the sub-sequence layers which are higher in the layer hierarchy than the sub-sequence layer that contains the image. The selectively decoded sub-sequence layers can be processed to implement fast forward and/or fast reverse trick play.

BRIEF DESCRIPTION OF THE DRAWINGS

Preferred embodiments of the present invention will be described below in more detail, with reference to the accompanying drawings, in which.

Figure 1:
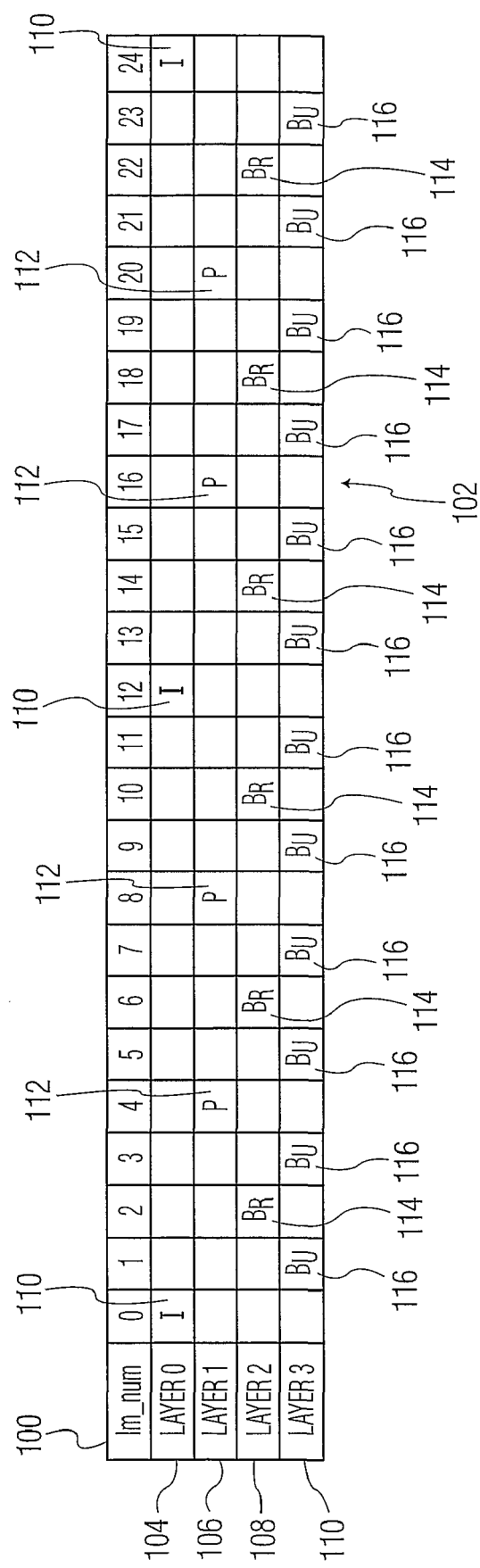
FIG. 1 depicts a table of a plurality of sub-sequence layers arranged in a layer hierarchy in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION

The present invention addresses the deficiencies of the prior art by providing a method and apparatus for supporting trick play on a video decoder using temporal layering of coded images. In particular, images can be encoded into sub-sequence layers defined in a layer hierarchy such that any sequential combination of sub-sequence layers that begins with a first layer, 0, results in a group of images that temporally are substantially evenly spaced. High quality video trick play thus can be achieved using less than the total number of sub-sequence layers provided in an encoded video stream; unused sub-sequence layers need not be decoded. Accordingly, the amount of video processing required to provide high quality video trick play can be minimized.

For example, in a four sub-sequence layer scheme, layers 0, 1 and 2 can be decoded and combined to provide high quality playback at a speed that is approximately twice normal playback speed, without requiring that layer 3 be decoded. Similarly, layers 0 and 1 can be decoded and combined to provide high quality playback at a speed that is roughly 4 times the normal playback speed, while layers 2 and 3 can remain encoded. Layer 0 can be exclusively decoded to provide high quality playback at a speed that is approximately 8 times the normal playback speed. Other playback speeds can be obtained by repeating or skipping selected ones of the decoded images.

Supplemental enhancement information (SEI) and video usability information (VUI) can be provided in the video bitstream. The SEI and VUI can include information which may be used by a decoder to optimize decoding of the video bitstream. For instance, the SE) and/or VU) can indicate to the decoder the temporal layer coding structure with which the video bitstream is encoded. The decoder can process the SEI and/or VUI to select which sub-sequence layers to decode for a particular fast forward or fast reverse speed. Notwithstanding, the encoding scheme that is used may still comply with a desired standard, such as H.264. Thus, a decoder not programmed to process the SEI and VUI may ignore such information and decode the video bitstream in a conventional manner.

Referring to FIG. 1, a table 100 depicting a group of images 102 contained in a plurality of sub-sequence layers 104, 106, 108, 110 is shown. The subsequence layers 104, 106, 108, 110 are arranged in a layer hierarchy. For example, the table 100 includes four sub-sequence layers, illustratively layer 0, layer 1, layer 2 and layer 3. Nonetheless, the invention is not limited in this regard; the table 100 can include more or fewer than four sub-sequence layers. For instance, the table 100 can include three sub-sequence layers, five sub-sequence layers, six sub-sequence layers, or any other number of sub-sequence layers.

Layer 0 contains intra coded pictures or slices (hereinafter "I-images") 110 which are substantially temporally evenly spaced throughout the group of images 102. For instance, image numbers 0, 12 and 24 can be encoded as I-images on layer 0. If 8× fast forward or fast reverse play is initiated, such trick play can be implemented by exclusively decoding layer 0. Thus, it is not required to decode layer 1, layer 2 or layer 3 to implement 8× fast forward or fast reverse play, which minimizes the amount of video processing required.

Illustratively, layer 1 contains predictive pictures or slices (hereinafter "P-images") 112. The P-images are temporally spaced such that when layer 0 and layer 1 are decoded and combined into a video bitstream, the combination of the layer 0 and layer 1 images are temporally substantially evenly spaced throughout the group of images 102. For instance, image numbers 4, 8, 16 and 20 can be encoded as P-images. Accordingly, the combination of layer 0 and layer 1 contain image numbers 0, 4, 8, 12, 16, 20 and 24.

Each of the P-images 112 on layer 1 can be predicted from an I-image 110 on layer 0 or another P-image 112 on layer 1. Accordingly, only layer 0 and layer 1 need be decoded to display the layer 0 and layer 1 images 110, 112. Thus, if 4× fast forward or fast reverse play is initiated, such trick play can be implemented without requiring layer 2 and layer 3 to be decoded.

In FIG. 1, layer 2 contains reference bidirectional images ($B_R$-images) 114. The $B_R$-images 114 can be used to predict $B_U$-images 116 on layer 3 or other $B_R$-images 114 on layer 2. In the $B_R$-images 114, a nal_ref_idc in a network abstraction layer (NAL) header can be set to a non-zero value to indicate that the $B_R$-images 114 can be used for reference for decoding other images. The $B_R$-images are temporally spaced such that when layer 0, layer 1 and layer 2 are decoded and combined into a video bitstream, the combination of the images on these layers are temporally substantially evenly spaced throughout the group of images 102. For instance, image numbers 2, 6, 10, 14, 18 and 22 can be encoded as Br-images. Accordingly, the combination of layer 0, layer 1 and layer 2 can contain image numbers 0, 2, 4, 6, 8, 10, 12, 14, 16, 18, 20, 22 and 24.

Each of the $B_R$-images 114 on layer 2 can be predicted from one or two other images. For instance, each $B_R$-image 114 can be predicted from an I-image 110 on layer 0, a P-image 112 on layer 1, another $B_R$-image 114 on layer 2, or any pair of such images. Accordingly, only layer 0, layer 1 and layer 2 need be decoded to display the layer 0, layer 1 and layer 2 images 110, 112, 114. Thus, if 2× fast forward or fast reverse play is initiated, such trick play can be implemented without requiring layer 3 to be decoded.

As depicted in FIG. 1, layer 3 can contain $B_U$-images 116, which can be any images not otherwise encoded and contained on another layer. In one arrangement, the $B_U$-images 116 can be unused for reference for other images, although the invention is not limited in this regard. In any of the $B_U$-images 116 that are not used as a reference for other images, the nal_ref_idc in the NAL header can be set to zero to provide an indication of such. Each of the $B_U$-images 116 can be predicted from an I-image 110 on layer 0, a P-image 112 on layer 1, a $B_R$-image 114 on layer 2, another $B_U$-image 116 on layer 3, or any pair of such images. Each layers 104, 106, 108, 110, namely layer 0, layer 1, layer 2 and layer 3, can be decoded for normal speed forward or reverse play.

Importantly, in addition to 2×, 4× and 8× fast forward and fast reverse trick play modes, the sub-sequence layering scheme presented herein can be used to implement other fast forward and fast reverse speeds. For example, if 3× trick play speed is desired, layer 0, layer 1 and layer 2 can be decoded, and selected ones of the images contained on these layers can be skipped during trick play to present a playback speed greater than 2×. Alternatively, layer 0 and layer 1 can be decoded without decoding layer 2 and layer 3. Selected images on layer 0 and/or layer 1 can be repeated to present a playback speed less than 4×. The skipping and/or repeating of images can be implemented in any suitable fashion to achieve a desired trick play speed.

Figure 2:
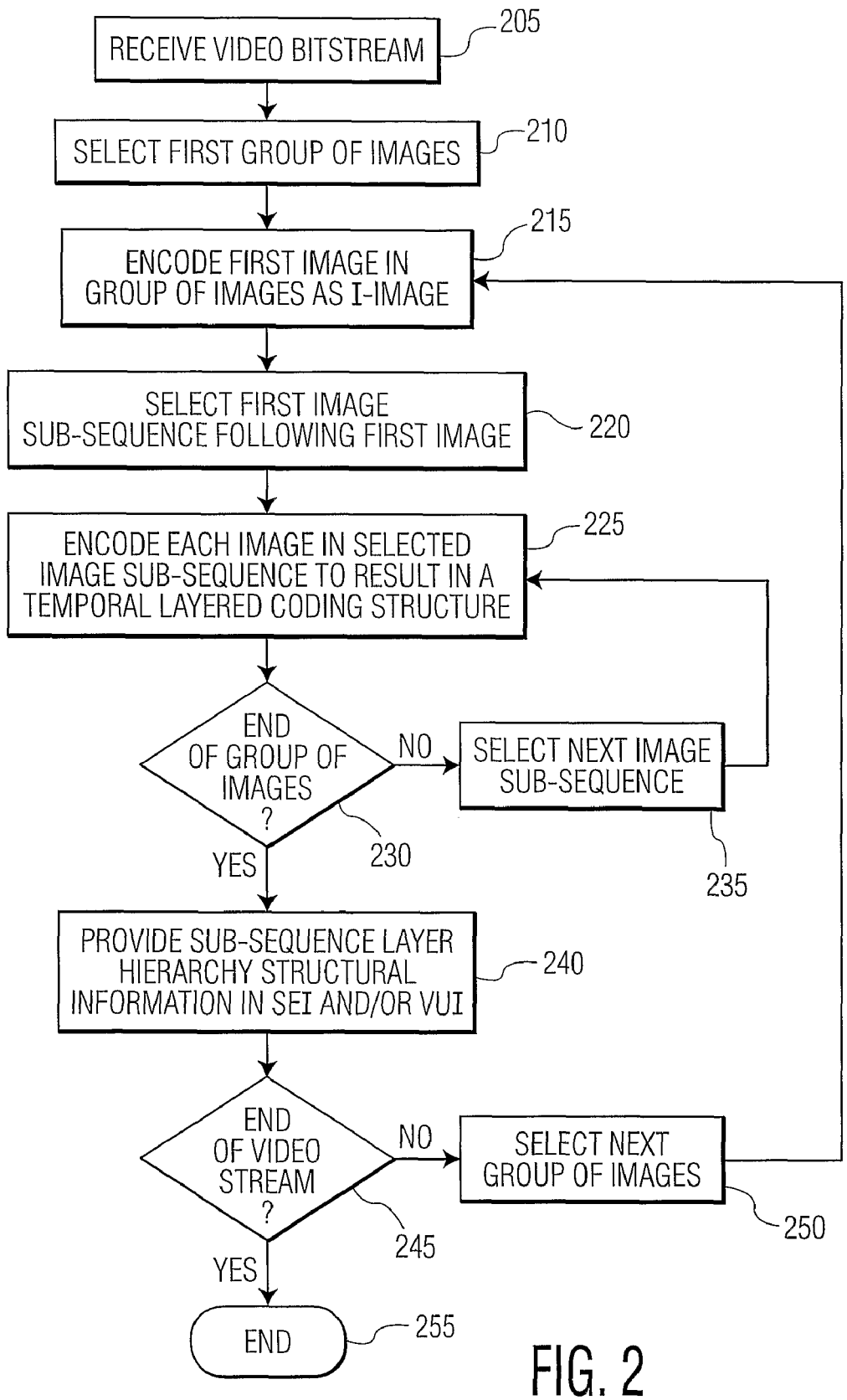
FIG. 2 depicts a flowchart of a video encoding scheme in accordance with an embodiment of the present invention.

FIG. 2 depicts a flowchart of a video encoding scheme in accordance with an embodiment of the present invention. The method 200 of FIG. 2 begins at step 205 where a video stream is received. At step 210, a first group of images is selected. Proceeding to step 215, a first image in the group of images is encoded as an I-image. At step 220, a first image sub-sequence following the first image is selected. Continuing to step 225, each image in the selected image sub-sequence is encoded to result in a temporal layered coding structure, for instance the structure depicted in FIG. 1.

Referring to decision box 230 and step 235, if the end of the group of images has not been reached, a next image sub-sequence is selected. Steps 225 and 235 are repeated until the end of the group of images is reached. Sub-sequence layer hierarchy structural information then can be provided in SEI and/or VUI messages associated with the group of images, as shown in step 240. Referring to decision box 245 and step 250, if the end of the video stream has not yet been reached, a next group of images is selected and the process is repeated. Otherwise, at step 225 the method is exited.

Figure 3:
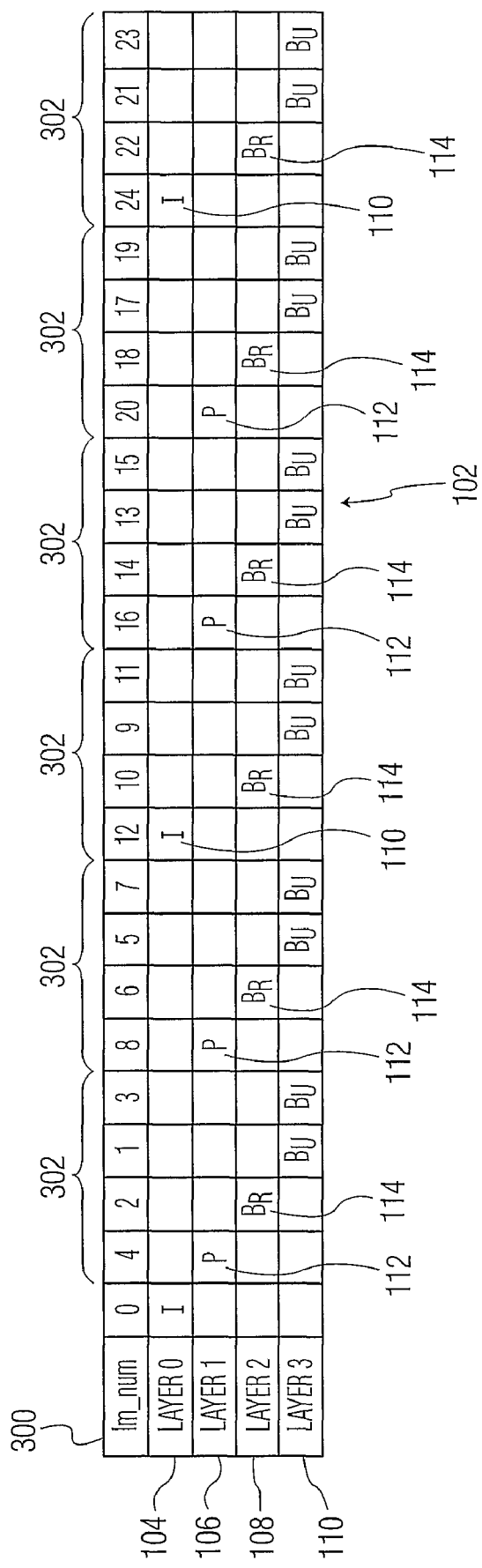
FIG. 3 depicts a table of a plurality of sub-sequence layers arranged in a layer hierarchy in accordance with an alternate embodiment of the present invention.

FIG. 3 depicts a table of a plurality of sub-sequence layers arranged in a layer hierarchy in accordance with an alternate embodiment of the present invention. In FIG. 3, a table 300 is shown which depicts an example of an encoding order which can be used to encode the group of images 102 into the sub-sequence layers 104, 106, 108, 110. The group of images 102 is parsed into sub-sequences 302, with each sub-sequence including an I-image 110 or a P-image 112. For each sub-sequence 302, the I-images 110 or P-images 112 can be the first images which are encoded. The I-images 110 are encoded into layer 0, as shown. P-images 112 then are encoded into layer 1. Each P-image 312 can be predicted from an I-image 310 or another P-image 312. Further, the reference I-image 310 or P-image 312 can be temporally positioned before or after the P-image 312 being encoded. A $B_R$-image 114 in each sub-sequence 302 is then encoded into layer 2. Next, the Bu-images 116 are encoded into layer 3. In one arrangement, the $B_R$-images 114 and the Bu-images 116 can be exclusively predicted from other images within the same sub-sequence 302. However, the invention is not limited in this regard and the $B_R$-images 114 and the Bu-images 116 also can be predicted from images in other sub-sequences 302.

Figure 4:
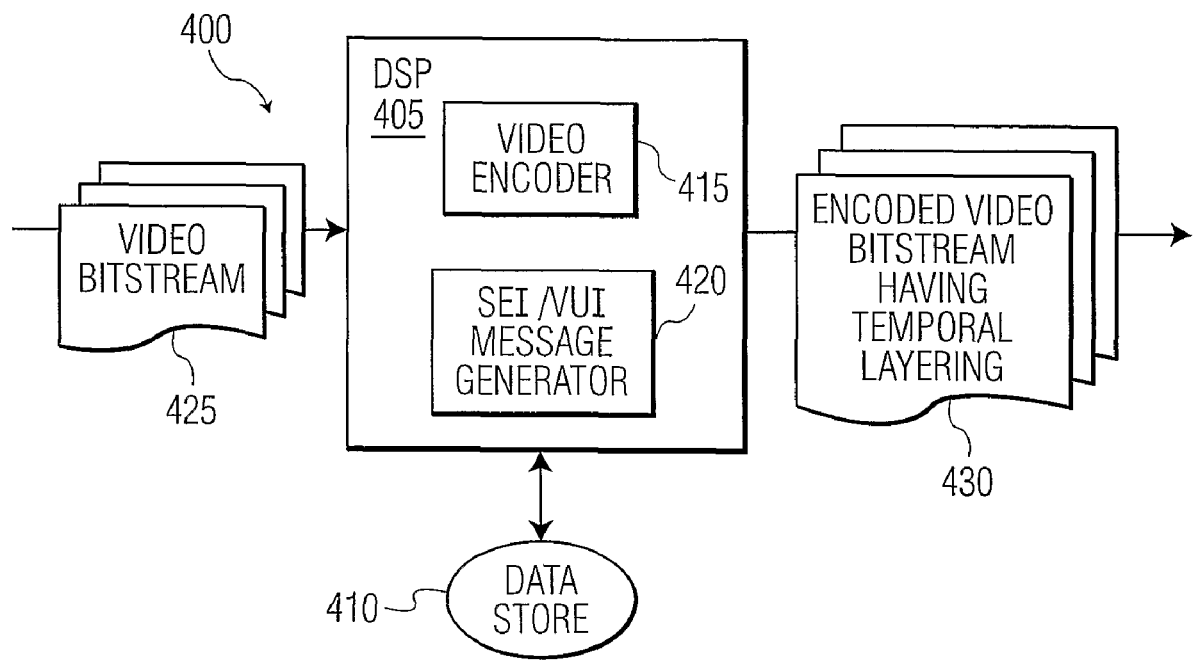
FIG. 4 depicts a high level block diagram of a video encoding system in accordance with an embodiment of the present invention.

FIG. 4 depicts a high level block diagram of a video encoding system in accordance with an embodiment of the present invention. The video encoding system 400 of FIG. 4 illustratively comprises a digital signal processor (DSP) 405 and a data store 410. The data store 410 includes one or more data storage devices. For example, a data storage device can be a magnetic storage medium, such as a hard disk drive (HDD), an optical storage medium, such as a digital video disk (DVD), an electronic storage medium, such as random access memory (RAM), a magneto/optical storage medium, or any other suitable storage device. Alternatively, the data store 410 can include any combination of storage devices. The data store 410 is used to store program code executable by the DSP 405 to implement video encoding.

The DSP 405 comprises any processor suitable for processing digital video signals. The DSP 405 of FIG. 4 includes a video encoder 415 that encodes an input video bitstream 425 into an encoded video bitstream 430 having temporal layering. For example, in the case that the video encoded video bitstream 430 is an H.264 video bitstream, the video encoder 415 can be an H.264 video encoder which implements the encoding methods described herein. Nonetheless, the invention is not limited in this regard and any other suitable video encoder can be used.

The DSP 405 of FIG. 4 also includes an SEI/VUI message generator 420. The SEI/VUI message generator 420 generates the previously described SEI and/or VUI messages and communicates such messages to the video encoder 415. The video encoder 415 includes the generated messages into the encoded video bitstream 430. The messages can be inserted into the video bitstream 430 during the video encoding process, or after the video has been encoded.

Figure 5:
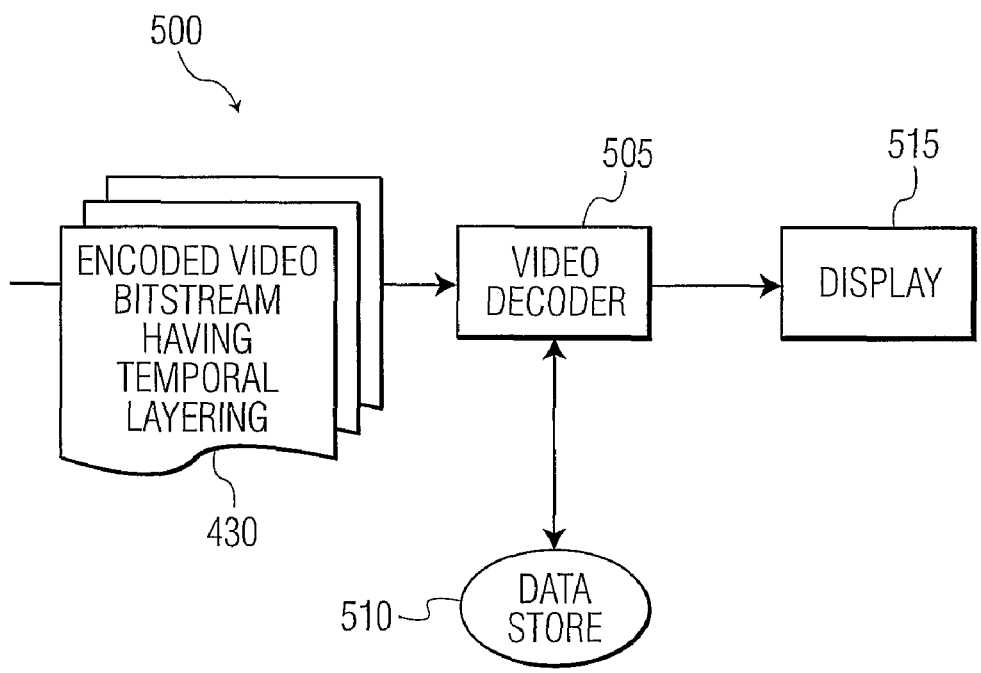
FIG. 5 depicts a high level block diagram of a video decoding system in accordance with an embodiment of the present invention.

FIG. 5 depicts a high level block diagram of a video decoding system in accordance with an embodiment of the present invention. The video decoding system 500 FIG. 5 illustratively comprises a video decoder 505 and a data store 510. The video decoder 505 selectively decodes selected ones of the sub-sequence layers contained in the encoded video stream 430 in accordance with a decoding scheme compatible with the encoded video bitstream 430. In addition, the video decoder 505 processes the SEI and/or VUI messages to select which sub-sequence layers to decode, for instance layer 0, layers 0 and 1, layers 0, 1 and 2, etc. The decoded video bitstream can then be communicated to a display 515 for viewing.

The data store 510 can include one or more data storage devices. For example, a data storage device can be a magnetic storage medium, such as a hard disk drive (HDD), an optical storage medium, such as a digital video disk (DVD), an electronic storage medium, such as random access memory (RAM), a magneto/optical storage medium, or any other suitable storage device. Alternatively, the data store 510 can include any combination of storage devices. The data store 510 is used to store program code executable by the video decoder 505 to implement video decoding.

Figure 6:
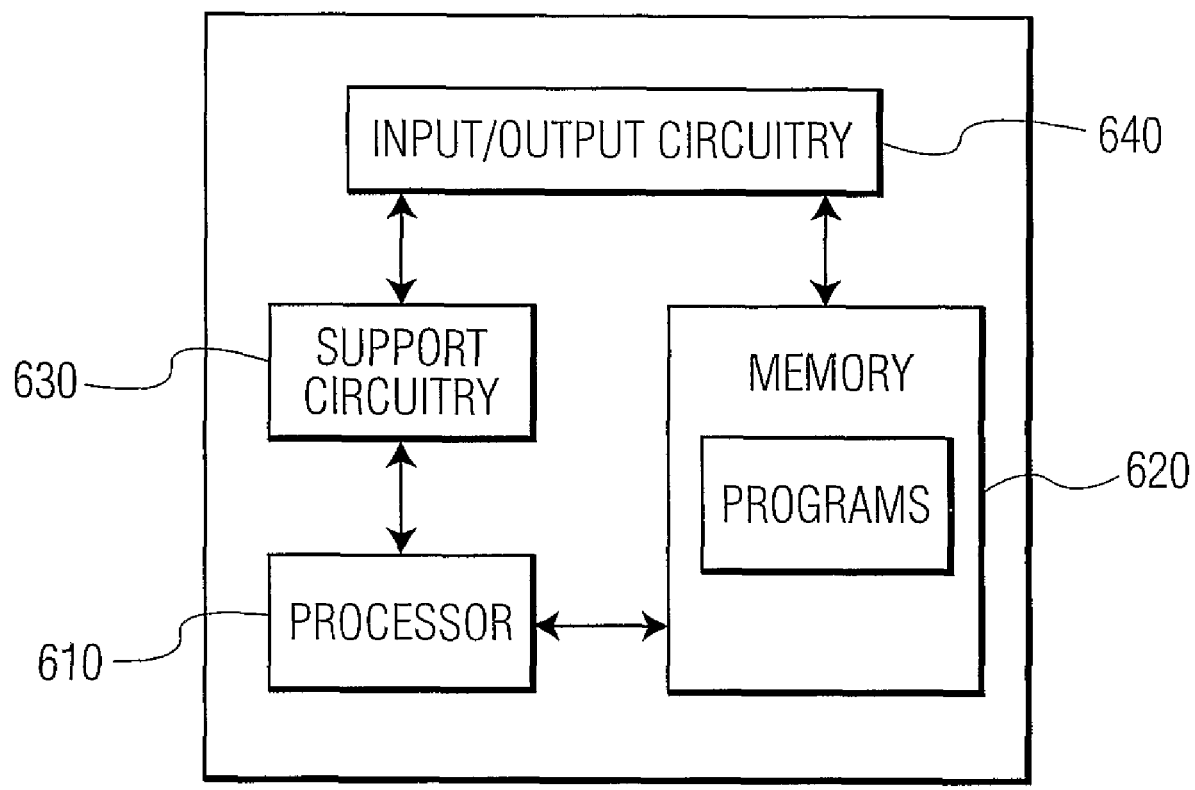
FIG. 6 depicts a high level block diagram of an embodiment of a video encoder or a video decoder suitable for use in the video encoding system of FIG. 4 and/or the video decoding system of FIG. 5, respectively.

FIG. 6 depicts a high level block diagram of an embodiment of a video encoder 415 or video decoder 505 suitable for use in the video encoding system 400 of FIG. 4 and video decoding system 500 of FIG. 5, respectively. The video encoder/decoder 600 of FIG. 6 comprises a processor 610 as well as a memory 620 for storing control programs, algorithms and the like. The processor 610 cooperates with conventional support circuitry 630 such as power supplies, clock circuits, cache memory and the like as well as circuits that assist in executing the software routines stored in the memory 620. As such, it is contemplated that some of the process steps discussed herein as software processes may be implemented within hardware, for example, as circuitry that cooperates with the processor 610 to perform various steps. The video encoder/decoder 600 also contains input-output circuitry 640 that forms an interface between the various respective functional elements communicating with the video encoder/decoder 600.

Although the video encoder/decoder 600 of FIG. 6 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

The present invention also can be embedded in a computer program product, which comprises all the features enabling the implementation of the methods described herein, and which when loaded in a processing system is able to carry out these methods. Computer program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

While the foregoing is directed to the preferred embodiment of the present invention, other and further embodiments of the invention may be devised without departing from the basic scope thereof. Accordingly, the scope of the present invention is determined by the claims that follow.

The invention claimed is:

1. A method for encoding video content into a temporal layered coding structure comprising:
   defining a plurality of sub-sequence layers in a layer hierarchy;
   selectively assigning each of a plurality of images within a sub-sequence of a group of images to a respective one of said sub-sequence layers such that a grouping of images contained in any sequential combination of sub-sequence layers that includes a hierarchically lowest of said sub-sequence layers results in a group of images that temporally are substantially evenly spaced;
   wherein intra images (I-images) are exclusively assigned to said hierarchically lowest sub-sequence layer, predictive images (P-images) are assigned to a second of said sub-sequence layers, said second sub-sequence layer being one level higher than said lowest sub-sequence layer in said layer hierarchy and a selected first set of $B_R$-images are assigned to a third of said sub-sequence layers, said third sub-sequence layer being one level higher than said second sub-sequence layer in said layer hierarchy, said $B_R$-images being predicted exclusively from images selected from the group consisting of I-images and P-images.

2. The method of claim 1, further comprising:
   predicting each non-intra image exclusively from at least one of said plurality of images which are assigned to a sub-sequence layer that is equal or lower in said layer hierarchy than the sub-sequence layer containing said each non-intra image.

3. The method according to claim 1, wherein said I-images temporally are substantially evenly spaced.

4. The method of claim 1, wherein said I-images and said P-images form a group of images that temporally are substantially evenly spaced.

5. The method of claim 1, wherein said I-images, said P-images and said BR-images form a group of images that temporally are substantially evenly spaced.

6. The method of claim 1, further comprising:
   selecting a second set of bidirectional images ($B_U$-images), said $B_U$-images being predicted exclusively from images selected from the group consisting of I-images, P-images and $B_R$-images;
   assigning said $B_U$-images to a fourth of said sub-sequence layers, said fourth sub-sequence layer being one level higher than said third sub-sequence layer in said layer hierarchy.

7. The method of claim 1, further comprising providing sub-sequence layer hierarchy structural information in at least one message selected from the group consisting of sub-sequence information (SEI) messages, sub-sequence layer characteristic SEI massages and video usability information (VUI) messages, said layer hierarchy structural information indicating the temporal layered coding structure.

8. The method of claim 6, wherein said $B_U$-images temporally are substantially evenly spaced in said fourth sub-sequence layer.

9. A video encoder comprising a processor and a memory, for encoding video content into a temporal layered coding structure, said video encoder adapted to define a plurality of sub-sequence layers in a layer hierarchy and selectively assign each of a plurality of images within a sub-sequence of a group of images to a respective one of said sub-sequence layers such that a grouping of images contained in any sequential combination of sub-sequence layers that includes a hierarchically lowest of said sub-sequence layers results in a group of images that temporally are substantially evenly spaced;
   wherein said video encoder assigns intra images (I-images) exclusively to said hierarchically lowest sub-sequence layer and predictive images (P-images) to a second of said sub-sequence layers, said second sub-sequence layer being one level higher than said lowest sub-sequence layer in said layer hierarchy and a selected first set of $B_R$-images are assigned to a third of said sub-sequence layers, said third sub-sequence layer being one level higher than said second sub-sequence layer in said layer hierarchy, said $B_R$-images being predicted exclusively from images selected from the group consisting of I-images and P-images.

10. The video encoder of claim 9 wherein said video encoder predicts each non-intra image exclusively from at least one of said plurality of images which are assigned to a sub-sequence layer that is equal or lower in said layer hierarchy than the sub-sequence layer containing said each non-intra image.

11. The video encoder of claim 9, wherein said I-images temporally are substantially evenly spaced.

12. The video encoder of claim 9, wherein said I-images and said P-images form a group of images that temporally are substantially evenly spaced.

13. The video encoder of claim 9, wherein said I-images, said P-images and said $B_R$-images form a group of images that temporally are substantially evenly spaced.

14. The video encoder of claim 9 wherein said video encoder selects a second set of bidirectional images ($B_U$-images), said $B_U$-images being predicted exclusively from images selected from the group consisting of I-images, P-images and $B_R$-images, and said video encoder assigns said $B_U$-images to a fourth of said sub-sequence layers, said fourth sub-sequence layer being one level higher than said third sub-sequence layer in said layer hierarchy.

15. The video encoder of claim 14, wherein said $B_U$-images temporally are substantially evenly spaced in said fourth sub-sequence layer.

16. The video encoder of claim 9, comprising a message generator that provides sub-sequence layer hierarchy structural information in at least one message selected from the group consisting of sub-sequence information (SEI) messages, sub-sequence layer characteristic SEI massages and video usability information (VUI) messages, said layer hierarchy structural information indicating the temporal layered coding structure.

* * * * *